United States Patent [19]

Moore

[11] 4,434,011
[45] Feb. 28, 1984

[54] METHOD AND APPARATUS FOR RETRIEVING OBJECTS FROM THE GROUND

[75] Inventor: Joseph L. Moore, Abilene, Tex.

[73] Assignee: Proficient Systems, Inc., Abilene, Tex.

[21] Appl. No.: 358,382

[22] Filed: Mar. 15, 1982

[51] Int. Cl.³ .................. B65F 3/02; A01B 43/00
[52] U.S. Cl. ............................ 134/6; 134/104; 15/21 E; 15/78; 56/328 R
[58] Field of Search ............... 134/6, 104; 15/21 E, 15/78; 56/328 R

[56] References Cited

U.S. PATENT DOCUMENTS

| | | | |
|---|---|---|---|
| 667,580 | 2/1901 | Rogers . | |
| 1,859,980 | 5/1932 | Mueller . | |
| 1,879,905 | 9/1932 | Liebfried . | |
| 2,298,145 | 10/1942 | Merrylees | 294/114 |
| 2,539,596 | 1/1951 | Smith | 56/328 |
| 2,599,715 | 6/1952 | Lepper | 56/328 |
| 2,639,573 | 5/1953 | McLaughlin | 56/328 |
| 2,643,754 | 6/1953 | Doak | 198/11 |
| 2,664,691 | 1/1954 | Wiebe | 56/328 |
| 2,666,665 | 1/1954 | Whitcher et al. | 294/87 |
| 2,694,284 | 11/1954 | Kortz | 56/328 |
| 2,792,253 | 5/1957 | Bliss | 294/160 |
| 2,804,336 | 8/1957 | Thompson | 296/61 |
| 3,210,921 | 10/1965 | Middlesworth et al. | 56/328 |
| 3,407,581 | 10/1968 | Wild | 56/328 |
| 3,451,488 | 6/1969 | Taketa | 172/350 |
| 3,475,889 | 11/1969 | Overstreet et al. | 56/328 |
| 3,483,687 | 12/1969 | Tanner, Jr. | 56/328 |
| 3,534,535 | 10/1970 | Reynolds et al. | 56/328 |
| 3,623,306 | 11/1971 | Reynolds et al. | 56/328 |
| 3,712,660 | 1/1973 | Moore | 294/61 |
| 3,807,154 | 4/1974 | Moore | 56/328 |
| 3,888,370 | 6/1975 | Gamblin | 56/328 R X |
| 3,993,141 | 11/1976 | Donohue | 56/328 R |

OTHER PUBLICATIONS

Article "Litter Retriever Picked Up by State", 1973 I, Virginian-Pilot.

*Primary Examiner*—Arthur D. Kellogg
*Attorney, Agent, or Firm*—Richards, Harris & Medlock

[57] ABSTRACT

A method and apparatus for collecting flat or semiflat materials while simultaneously retrieving bottles and cans includes a ground engageable rotating drum (52) with a plurality of fingers (60) extending radially from the drum. A plurality of toothed discs (210) is rotatably mounted on a shaft and driven in conjunction with the rotation of the drum in a direction opposite that of the drum. The toothed discs (210) are positioned adjacent to but above ground level during operation of the apparatus and assists in the engagement and movement of objects by the drum and fingers to a collection location (32). A plurality of belts (130) is engaged between pulleys (212) mounted intermediate of the toothed discs (210) and corresponding pulleys (126) on a shaft spaced from the toothed discs. The belts are positioned on the trailing side of the drum and above the toothed discs and assist in engagement and movement of objects by the drum and fingers to the collection station. Stripper bars (180) assist in dislodging objects from between the fingers of the drum. A second assembly of a plurality of toothed discs (220) is mounted on a shaft and driven in conjunction with the rotation of the drum in the same direction of the drum. This second disc assembly is positioned near the top side of the drum and adjacent the structure for dislodging objects from the drum fingers. Rotation of this second disc assembly assists in directing objects carried to the top side of the drum to the collection station.

20 Claims, 10 Drawing Figures

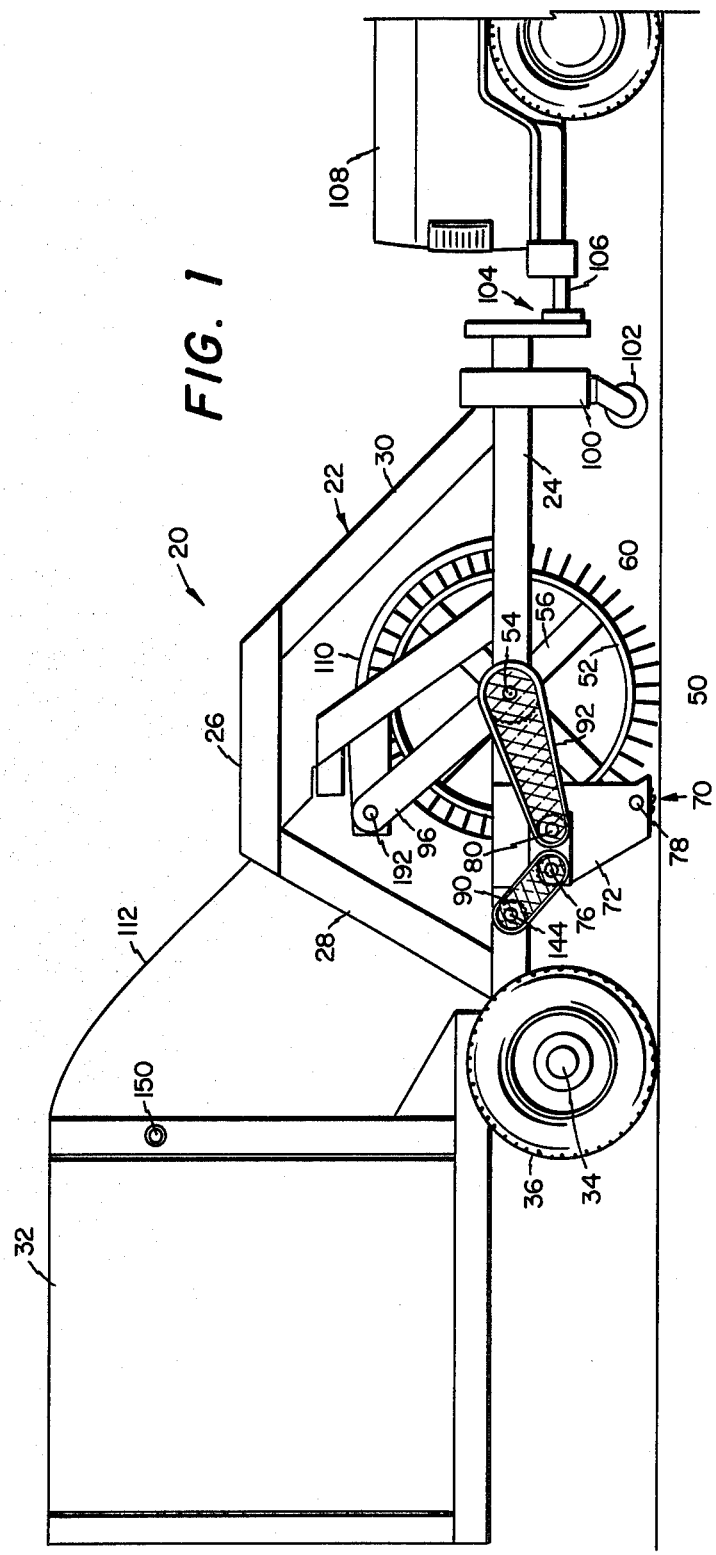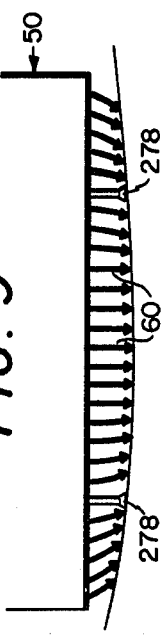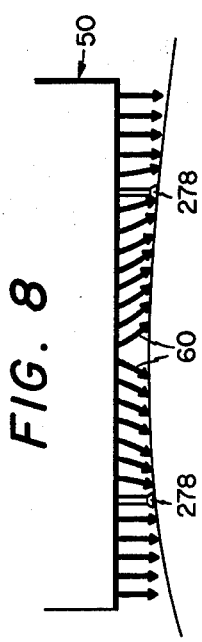

METHOD AND APPARATUS FOR RETRIEVING OBJECTS FROM THE GROUND

TECHNICAL FIELD

The present invention relates to a method and apparatus for retrieving and collecting objects from the ground, and more particularly for such a method and apparatus used in litter retrieval.

BACKGROUND ART

Many man-hours are expended in the collection of litter and other debris from large community areas such as along streets and highways, parks, playgrounds, along beach areas and open commercial areas. Because of the difficulty of designing a machine which will collect the various types and sizes of litter and operate over various types of ground surfaces, manual retrieval has often been relied on. Moreover, manual retrieval methods are slow and many times are ineffective, particularly where large areas must be patrolled.

Machines have been designed to supplement or replace the need for manual retrieval of litter. An effective apparatus for litter retrieval is disclosed in U.S. Pat. No. 3,807,154, to the inventor of the present invention, issued Apr. 30, 1974. This patent discloses the use of a towed apparatus having a rotatable drum which is rotated upon ground engagement. A plurality of flexible fingers extends radially from the drum and has a particular configuration for receiving bottles and cans therebetween during the movement of the apparatus along the ground surface. Bottles, cans and similar objects engaged by the drum and fingers are collected in a hopper after being stripped from the fingers.

Although the device described in U.S. Pat. No. 3,807,154 is capable of retrieving some objects, such as bottles and cans, the effectiveness of the device has been less than completely satisfactory for other types of litter. Where the particular object cannot be grabbed between the resilient fingers extending from the drum, then the apparatus may fail to collect the debris.

It is critical that an apparatus for collecting litter be able to retrieve bottles, cans and objects having arcuate outer surfaces of a form retaining nature, as well as simultaneously collecting materials such as paper, and various containers made thereof, textile materials and other flat or semiflat objects. Thus, the need has arisen for a device which can simultaneously collect both bottles and cans, which make up a large portion of the litter in large public and private areas, as well as other debris of differing shapes and materials.

Prior apparatus with respect to these types of devices have also failed to properly disclose a means for supporting the weight of the drum and finger assembly without sustaining damage to the fingers. Further, such support must not permit an excessive "dead space" which is not engaged by the fingers where the device encounters irregular terrain.

DISCLOSURE OF THE INVENTION

The present invention provides an improved method and apparatus for collecting flat or semiflat materials such as various paper, textile materials and the like, while simultaneously retrieving bottles and cans and other objects having cylindrical form retaining outer structures. In accordance with one embodiment of the invention, an apparatus has a ground engageable rotating drum with a plurality of fingers extending radially from the drum. A plurality of toothed discs is rotatably mounted on a shaft and driven in conjunction with the rotation of the drum in a direction opposite that of the drum. The toothed discs are positioned adjacent to but above ground level during operation of the apparatus and assist in the engagement and movement of objects by the drum and fingers to a collection location.

In one form of the invention, the toothed discs are positioned intermediate of circumferentially and radially projecting rows of fingers extending from the drum. The outer circumference of the toothed discs is substantially tangential to the outer circumference defined by the tips of the fingers extending from the drum. The toothed discs are located on the trailing side of the drum from the point of ground contact.

In accordance with a further embodiment of the invention, a plurality of belts is engaged between pulleys mounted intermediate of the toothed discs and corresponding pulleys on a shaft spaced from the toothed discs. The belts are positioned on the trailing side of the drum and above the toothed discs and assist in the engagement and movement of objects by the drum and fingers to the collection station.

In accordance with still a further embodiment of the invention, the apparatus of the present invention further includes a means for dislodging objects from between the fingers of the drum. A second assembly of a plurality of toothed discs is rotatably mounted on a shaft and driven in conjunction with the rotation of the drum in the same direction of the drum. This second disc assembly is positioned near the top side of the drum and finger assembly and adjacent the structure for dislodging objects from the drum fingers.

The second disc assembly is positioned such that the discs are intermediate of spaced rows of teeth positioned along the length of the drum. As objects are directed to the second disc assembly, and as the objects are dislodged from the drum fingers, the objects are directed by the rotation of the second disc assembly to a collection station. In one embodiment of the invention, the objects are carried to the collection station after engagement by the second disc assembly by a conveyor driven in conjunction with the rotation of the drum.

In the method of the present invention, objects are retrieved from the ground by moving the ground engageable drum over the ground surface. Upon rotation of the drum, objects are engaged between fingers and are moved upwardly with the drum's movement. A plurality of discs is rotatably mounted on a shaft adjacent the drum and finger assembly. The discs are driven in conjunction with the rotation of the drum in a direction opposite that of the drum. With the discs positioned adjacent the drum and finger assembly and slightly above ground level, litter, such as relatively flat paper articles and the like, is engaged by the discs and moved into and toward the drum and fingers. The objects engaged between the fingers are stripped from the fingers by a stripper bar mounted intermediate of the rows of fingers and adjacent the drum.

The objects directed between the toothed disc and the fingers are carried in the direction of travel of the fingers and drum using a plurality of belts mounted between the toothed disc shaft and a shaft spaced therefrom and adjacent the rotation of the tooth and drum assembly. The belts provide a semiconveyor arrangement to further direct objects along the path of rotation of the drum and to the collection location.

A plurality of toothed discs is also positioned adjacent the drum in the area of structure for stripping objects from between the fingers. This second set of toothed discs is rotated in the same direction as the drum and directs the objects to the collection location.

In accordance with another embodiment of the invention, the fingers extending from the drum are positioned in rows spaced along the longitudinal length of the drum. The fingers are formed of a resilient and flexible material, such as rubber, having a metal base attached to the drum. One row of fingers, however, positioned approximately one quarter of the length of the drum from each end of the drum, are replaced by spokes formed with a rigid inner structure with a resilient cover thereon. These two rows of spokes provide support to the weight of the drum as the drum traverses the ground surface. As a result of the positioning of these two support rows of spokes, a minimum of ground area is left uncovered where the apparatus encounters irregular terrain.

BRIEF DESCRIPTION OF THE DRAWINGS

For a more complete understanding of the present invention, and for further details and advantages thereof, reference is now made to the following Detailed Description, taken in conjunction with the accompanying Drawings, in which:

FIG. 1 is a side view of the apparatus of the present invention shown attached to a tow vehicle;

FIGS. 8 and 9 are schematic representations of the present invention as it traverses a crown and valley during operation over the ground surface.

DETAILED DESCRIPTION

Figure 2:
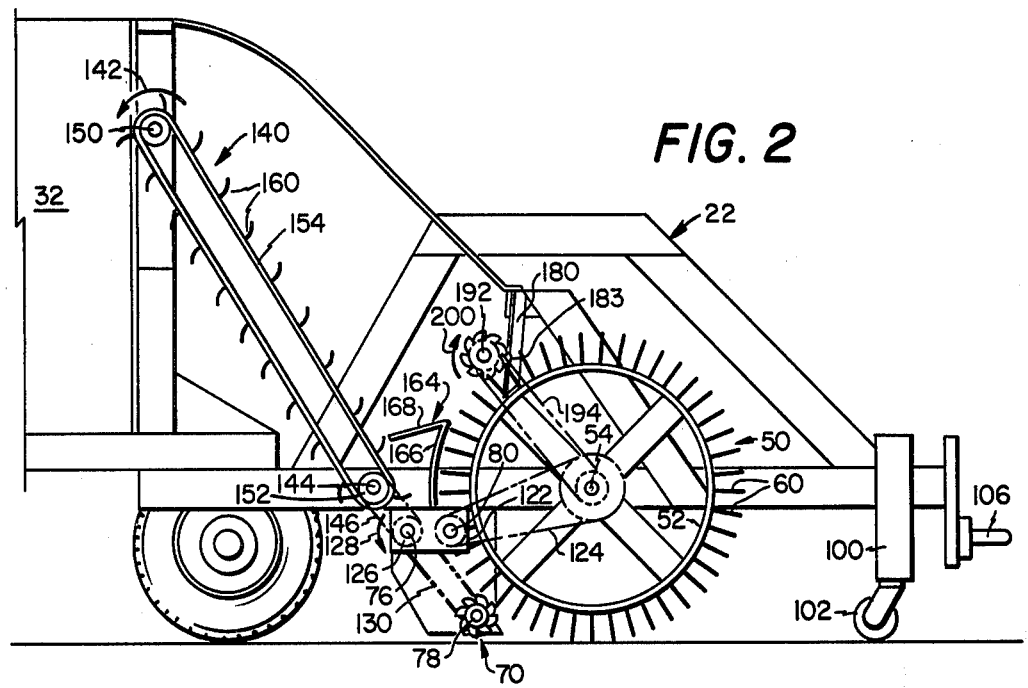
FIG. 2 is a side view of the apparatus of the present invention with the outer structure partially broken away to reveal the inner components of the apparatus.

The apparatus 20 of the present invention for retrieving objects from the ground includes a frame structure 22 including horizontal beams 24 and 26 spaced by transverse struts 28 and 30. A material collection hopper 32 is supported behind frame 22 and an axle assembly 34 supports the frame and collection hopper for movement over a ground surface on wheel and tire assembly 36.

The structure for retrieving objects from the ground includes a rotatable drum assembly 50 consisting of a drum 52 supported by arms 56 for rotation about an axle 54. A plurality of receiving fingers 60 is attached to and extends radially from drum 52.

A toothed disc assembly 70 is supported adjacent drum assembly 50 and behind the drum assembly near ground engagement. A side shield 72 serves in part as a structure for supporting toothed disc assembly 70 from frame 22. Toothed disc assembly 70 includes axle shafts 76 and 78 driven by an appropriate gear box operating from axle shaft 80 which is in turn driven by the rotation of drum assembly 50. Axle shaft 76 also drives a conveyor assembly which will be described hereinafter in greater detail. The drive provided therefor requires a chain guard 90 seen in FIG. 1. A chain guard 92 also is provided to protect the chain drive from drum assembly 50 to gear box axle shaft 80. A further chain guard 96 is shown in FIG. 1 and protects a drive chain from drum assembly 50 to a kicker assembly as will be described hereinafter in greater detail.

A forward wheel assembly 100 is attached at the point of connection of horizontal beam 24 and transverse strut 30 and includes a free wheeling wheel unit 102. A coupling assembly 104 is attached to the forward end of horizontal beam 24 and provides an appropriate hitch structure 106 for attachment of the apparatus to a tow vehicle such as truck 108 shown in FIG. 1.

A forward shield 110 partially encircles drum assembly 50 to provide protection around the drum assembly. This shield may be left off to provide visibility of the drum during rotation. Alternatively, the shield may consist of a wire screen to permit the operator to view the drum operation. A shield 112, having a wire screen top, also extends from the area of drum assembly 50 to collection hopper 32.

Figure 3:
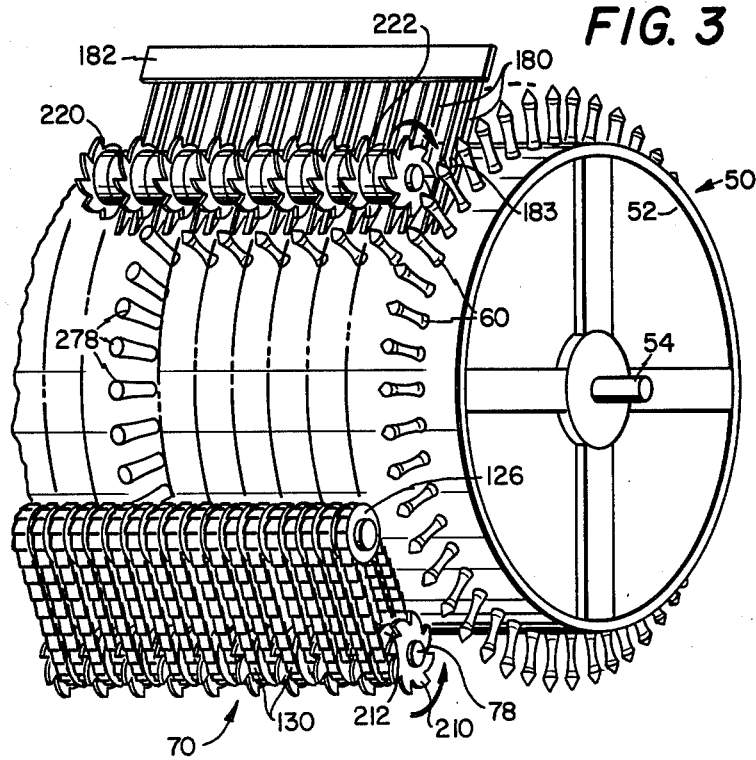
FIG. 3 is a perspective view of the drum assembly, the toothed disc assembly, the kicker assembly and stripper bars of the present invention.

FIG. 2 shows the retrieval apparatus 20 with the side shielding, guards and the like removed to reveal the inner structure of the device. FIG. 3 shows the pickup structure in perspective view without the shielding and other attendant structure. Referring to FIGS. 2 and 3, it can be seen that drum assembly 50 includes a cylindrical drum supported for rotation about axle 54 by arms 56. A plurality of fingers 60 extends radially from drum 52 and is positioned in rows spaced along the longitudinal length of the drum. Fingers 60 are also positioned such that the fingers are aligned along the length of the drum as viewed from the side. However, it will be appreciated that these fingers may be staggered so as not to be aligned along the longitudinal length of the drum as required to complete the object of the present invention.

Referring specifically to FIG. 2, a sprocket 120 is attached for rotation with axle 54 and drives shaft 80 at gear box 122 by way of chain 124. The rotation of shaft 80 of gear box 122 in turn drives shaft 76 to rotate a plurality of pulleys 126 in the direction indicated by arrow 128. The rotation of shaft 76 is communicated by way of flexible belts 130 to drive shaft 78 of toothed disc assembly 70. Shaft 76 also has an appropriate sprocket for driving a conveyor assembly 140 in the direction shown by arrow 142 by driving lower shaft 144 by way of chain 146. Conveyor assembly 140 includes an upper shaft and roller assembly 150 and a lower roller assembly 152 driven by the rotation of shaft 144. A conveyor belt 154 is entrained around rollers 150 and 152 and carries a plurality of spaced material carriers 160.

Although not specifically shown, disc assembly 70 and gear box 122 are mounted on a floating frame which is movable on an arc having a center at the axis of drum 52. This permits arcuate movement of disc assembly 70 upon engagement of objects, such as large rocks or stumps, during operation. A travel of about six to ten inches is provided in the preferred embodiment.

A material director 164 is positioned immediately above gear box 122. The director includes an arcuate first leg 166 which follows the curve defined by the outer tips of fingers 60 and is slightly spaced therefrom. A second leg 168 is joined to the upper end of leg 166 and angles rearwardly toward conveyor assembly 140.

A plurality of strippers 180 extend downwardly from a support bar 182 and is positioned in between the rows of fingers extending from drum 52. The lower ends of strippers 180 are in close proximity to drum 52 and almost tangential thereto. Preferably, these strippers are formed of metal angles having notches 183 (FIG. 3) cut in the sides to permit close positioning to fingers 60.

A kicker assembly 190 is located immediately rearwardly of strippers 180. The kicker assembly includes a rotatable shaft 192 driven by a chain 194 rotated from an appropriate sprocket attached to axle 54 of drum assembly 50. During operation of the unit, rotation of kicker assembly 190 is in the direction of arrow 200.

Referring now to FIG. 3, both toothed disc assembly 70 and kicker assembly 190 are shown in greater detail. Toothed disc assembly 70 includes lower shaft 78 having a plurality of toothed discs 210 positioned along the length of the shaft. Each disc is separated from the adjacent disc by a pair of pulleys 212. Similar pulleys 126 are attached to shaft 76 and flexible belts 130 are engaged between pulleys 126 and corresponding pulleys 212 on shaft 78.

Referring still to FIG. 3, kicker assembly 190 includes a plurality of toothed discs 220 of a design similar to discs 210. Discs 220 are separated by spacers 222 to provide approximately the same spacing as between discs 210 on shaft 78. The spacing and positioning of discs 210 and 220 position the discs intermediate of the rows of fingers 60.

Figure 4:
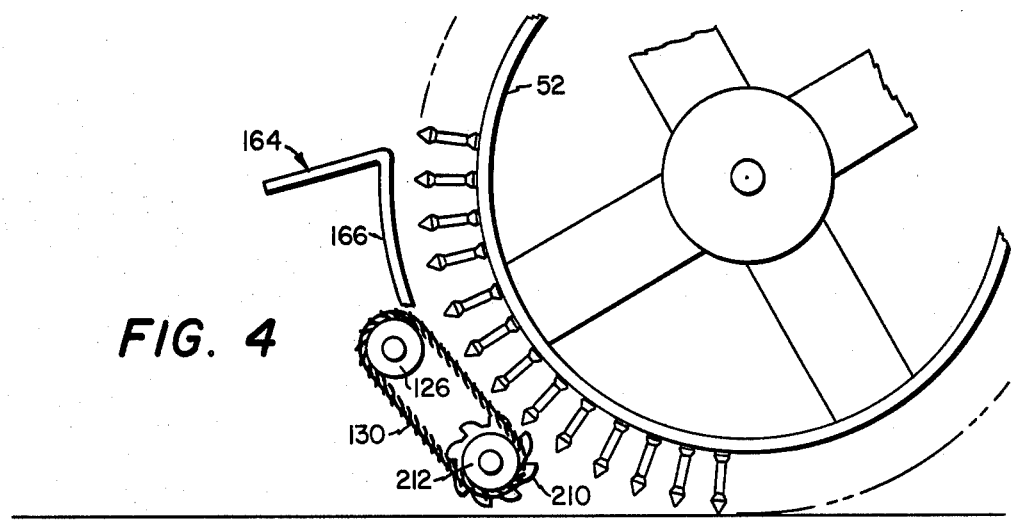
FIG. 4 is a side view of the drum assembly and lower toothed disc assembly used in the present invention.

As can be seen in FIG. 4, the tips of discs 210 are positioned relative to fingers 60 such that the outer circumference of discs 210 is approximately tangential to the outer circumference defined by the tips of fingers 60. With respect to the positioning of discs 220, they are slightly more inboard and pass between fingers 60.

As can be seen in FIGS. 3 and 4, belts 130 are positioned slighty radially outboard from the tips of fingers 60. Because of the relatively close spacing between belts 130, they provide a conveyor effect as will be discussed hereinafter in greater detail. The lower edge of leg 166 of material director 164 is substantially in line with and immediately above the upper point of travel of belts 130.

Figure 5:
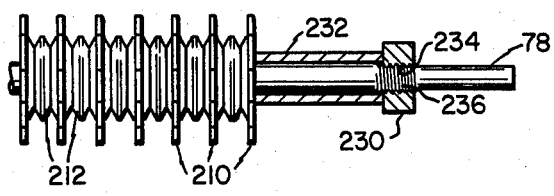
FIG. 5 is a section view of a portion of the lower toothed disc assembly.

Referring to FIG. 5, the pulleys 212 and discs 210 are mounted onto shaft 78 by using a compression fit supplied by fitting 230. Fitting 230 has a sleeve 232 for engaging the endmost disc 220 and an internal thread 234 for mating with threads 236 on shaft 78. By engaging fitting 230 onto axle shaft 78, a compressive force is applied to pulleys 212 and discs 210 to effect the transmission of rotative force from shaft 78 to the discs and pulleys. However, by controlling the torque and the compression load applied by fitting 230, the discs and pulleys may be permitted to slip in the case of engaging a blockage during operation.

Figures 6, 7:
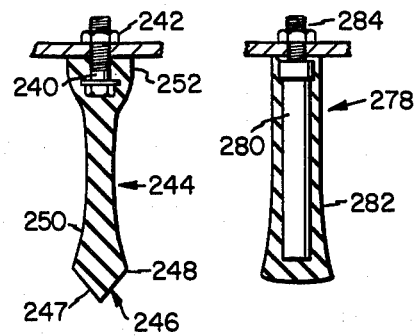
FIG. 6 is a section view of one of the fingers used in the present invention.
FIG. 7 is a section view of another of the fingers used in the present invention.

FIG. 6 illustrates a section view of one of the fingers 60. The finger includes a metallic base shaft 240 which is attached through the sidewall of drum 52 using a nut 242 on the inside surface. The end of shaft 240 is threaded to receive nut 242 thereon. A shoulder on the end of shaft 240, larger than the aperture through the sidewall of drum 52, permits the mounting of the fingers as shown in FIG. 6. A specially shaped body portion 244 is attached on the end of shaft 240. Body portion 244 is preferably formed of a resilient material, such as neoprene. The body portion includes a conically shaped lower end 246 forming a camming surface 247 with a maximum diameter at 248 and having an arcuate longitudinally extending concave article holding surface 250 extending to the radially inwardly end of the body portion and terminating in a circular rim at 252 of a diameter less than that of the lower end at 248 but greater than that of the central region of the article holding surface. It will be seen that no portion of the article holding surface 250 has a diameter greater than the diameter of 248.

In operation of the unit of the present invention, fingers 60 and spokes 278 of drum assembly 50 engage the ground surface as the apparatus is pulled by the tow vehicle. The weight of the drum is substantially supported by spokes 278. The engagement with the ground surface causes the drum assembly 50 to rotate clockwise as seen in FIGS. 1 and 2. As the drum rotates, it drives, by way of gear box 122, toothed disc assembly 70. By driving shaft 76, shaft 78 and discs 210 are driven by belts 130. Rotation of discs 120 is in a counterclockwise direction as seen in FIG. 2.

As the drum rotates and engages cans or bottles lying on or embedded in the ground surface, the cans or bottles will be forced between adjacent fingers. The objects first engage camming surface 247 and upon the flexure of the body portion 244 of the fingers, are then forced into the article holding area immediately above the camming surface. Because the bottle or can may be positioned in any random fashion, the bottle may be engaged by two or more fingers as the drum rotates. In any event, the lateral deflection of the fingers will permit the bottle to be received between the fingers and then retain the bottle or can within the grasp of the fingers as the drum continues to rotate.

In the prior art devices, a positive means of lifting various sizes of paper and other products other than bottles and cans has not been provided. However, the present invention provides toothed disc assembly 70 for this purpose. As the apparatus traverses the ground surface, discs 210 act to lift paper and other litter into the area between the toothed disc assembly and the ends of fingers 60. As a result of the counterrotation of these two components, paper and other similar debris are carried upwardly above discs 210 into contact between belts 130 and the outer tip of fingers 60. It will be appreciated that it is not necessary that the paper or other debris be spiked by the fingers but rather the material may merely be conveyed upwardly as a result of the entrapment between discs 210, belts 130 and fingers 60. Of course, some paper may be spiked by fingers 60 which would provide even more positive transmission of the litter upwardly as the drum rotates.

As the litter reaches the upper point of belts 130, it continues to move upwardly between fingers 60 and material director 164.

It has been found that the present apparatus must be moved at a sufficient speed to be economical. At higher speed, centrifugal force tends to dislodge the litter trapped between the fingers. In the present invention, disc assembly 70 and material director 164 act to prevent the dropping of litter from engagement between the finers of the drum assembly. Where disc assembly 70 is not employed, material director 164 will be extended downwardly to the area occupied by disc assembly 70 to prevent the loss of litter from engagement by the fingers due to centrifugal force.

Figure 10:
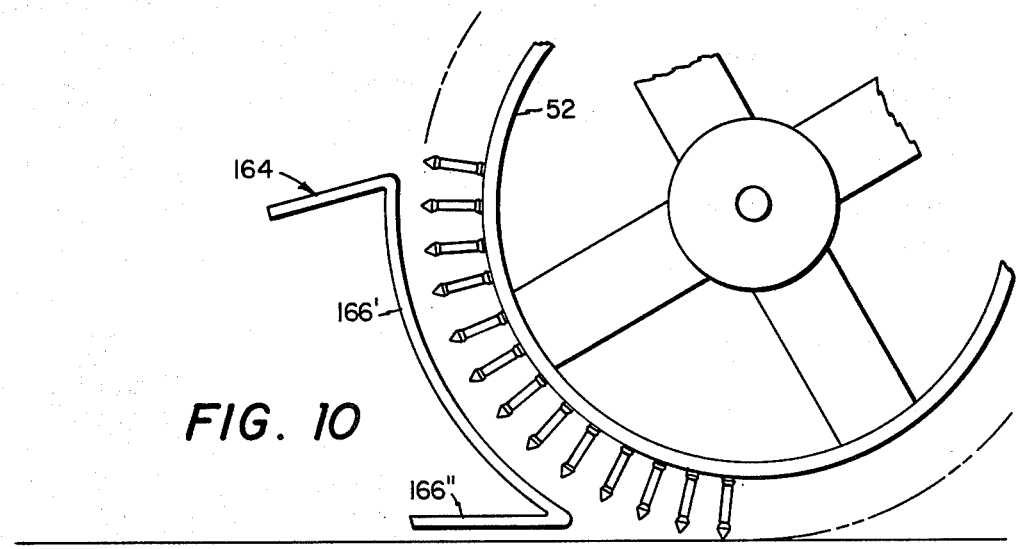
FIG. 10 illustrates an alternative embodiment wherein the lower disc assembly is deleted.

This alternative arrangement is shown in FIG. 10 wherein material director 164' has a lower leg 166' which extends behind drum assembly 50 from upper leg 168 to a point just above the ground surface. A foot skit 166" is attached to leg 166'. The material director is mounted by way of a floating frame which is movable on an arc having a center at the axis of drum 52 upon contact with objects encountered during operation.

At the upper point of their movement, bottles and cans and other debris which are grasped by the fingers are stripped therefrom upon engagement of strippers 180. This litter, as well as other litter which is carried to this upper point, is engaged by kicker assembly 190 rotating in a clockwise direction as seen in FIG. 2. The rotation of kicker assembly 190 directs the debris rearwardly where it is picked up by conveyor assembly 140 and carried upwardly into collection hopper 32 for later disposal.

Thus, the present invention provides a structure for not only positively collecting bottles and cans, but also a structure which simultaneously provides a very effective means for directing other debris of virtually all sizes and material upwardly with the movement of drum assembly 50 and thereafter onto a conveyor for disposal into a collection hopper.

The toothed disc assembly of the present invention also effectively operates in various terrains, including grass areas of differing heights, as well as paved areas or even gravel or sand areas. The toothed discs 210 operate to dislodge the litter and carry it upwardly for subsequent transmission and conveying by belts 130 between the belts and the fingers 60. This arrangement operates to lift debris and litter without necessitating the spiking of the material which is not always possible because of the material's composition or configurations. Thus, the present invention provides an extremely effective way of collecting the litter and debris without this requirement. The kicker assembly, incorporating a similar toothed disc arrangement, then acts to project the litter and debris which has been lifted by the unit to an area for removal to a collection hopper.

Although the present disclosure has described discs 210 and 220 as having the same configuration, it will be appreciated that varying configurations can be used for either or both of these discs. The present illustration is merely a disclosure of the best mode now known to the inventor but other toothed designs, ranging from a very fine tooth design to an even broader design, could be employed. Further, a disc composed of radial splines could also be substituted for the design disclosed. However, in the primary embodiment of the invention, the apparatus is designed to minimize the collection of unwanted debris such as grass, twigs, pebbles or rocks.

Because the drum assembly of the present invention engages the ground as it rotates, substantial load is placed upon the fingers to support the weight of the apparatus during operation. In the present invention, the two rows of spokes spaced inboard from the ends of drum 52 approximately one quarter of the length of the drum are of a special design to accommodate the weight of the apparatus. These spokes 278, shown in section in FIG. 7, include a rigid shaft 280 covered by a resilient covering 282, such as neoprene. The attachment end of the spoke 278 is threaded at 284 for attachment to the sidewall of drum 52. As can be seen in FIGS. 8 and 9, when the apparatus of the present invention traverses a crown (FIG. 7) or a valley (FIG. 8), very little "dead space" is provided. The dead space referred to is that area where the fingers are lifted from the ground surface and therefore may fail to collect debris or litter on the ground. As the apparatus of the present invention encounters a crown area, only a very small portion below the outer edges of the device is uncovered. Where the device encounters a valley, only a very small central portion of the area over which the apparatus passes is left uncovered. Thus, the present invention provides spokes which support the drum, especially over very hard surfaces where otherwise the more resilient fingers would be seriously damaged, while at the same time minimizing the dead space where the apparatus traverses an irregular terrain.

While the apparatus in the present invention has been described as used in the retrieval of litter, it has been found that the machine is ideally suited for collecting agricultural products from the ground. For instance, the apparatus may be used in the retrieval of corn which has been knocked to the ground during combining operations or as a result of the weather. In the use of the present invention to collect agricultural products from the ground, the apparatus may be used either with or without the toothed disc assembly 70. However, because of the tendency, as a result of centrifugal force, for the product to be dislodged from the fingers prior to collection, material director 164 serves to prevent the product from being dropped from the fingers prior to being discharged above the shield where the material is then directed to conveyor assembly 140.

Although preferred embodiments of the invention have been described in the foregoing Detailed Description and illustrated in the accompanying Drawings, it will be understood that the invention is not limited to the embodiments disclosed, but is capable of numerous rearrangements, modifications and substitutions of parts and elments without departing from the spirit of the invention. Accordingly, the present invention is intended to encompass such rearrangements, modifications and substitutions of parts and elements as fall within the spirit and scope of the invention.

I claim:

1. In a means for retrieving objects from the ground having a ground engageable rotating drum with a plurality of fingers extending therefrom for receiving the objects therebetween, the improvement comprising:
 a plurality of discs rotatably mounted on a shaft and driven in conjunction with the rotation of the drum in a direction opposite that of the drum, said toothed discs positioned adjacent said drum and the ground and assisting in the engagement and movement of objects by the drum and fingers to a collection location.

2. The retrieval means according to claim 1 wherein said discs have a toothed circumferential edge.

3. The retrieval means according to claim 1 wherein said fingers are attached to the drum in rows positioned along the length of the drum and said discs are positioned intermediate the rows of fingers.

4. The retrieval means according to claim 3 wherein the outer circumference of said discs is substantially tangential to the outer circumference defined by the tips of said fingers extending from the drum.

5. The retrieval means of claim 1 wherein said plurality of toothed discs is located on the trailing side of said drum from the point of ground contact of the drum.

6. The retrieval means according to claim 1 further comprising:

a plurality of belts engaged between pulleys positioned intermediate of said discs and corresponding pulleys spaced from the toothed disc shafts, the belts positioned on the trailing side of the drum from the discs and assisting in the engagement and movement of objects by the drum and fingers thereon to the collection station.

7. The retrieval means according to claim 1 further comprising:
means projecting between the fingers for dislodging objects from therebetween; and
a second assembly of a plurality of discs rotatably mounted on a shaft and driven in conjunction with the rotation of the drum in the same direction as the drum, said second disc assembly positioned near the top side of the drum and finger assembly and adjacent said means for dislodging the objects from the drum and finger assembly.

8. The retrieval means according to claim 7 wherein said second plurality of discs is positioned between spaced rows of teeth attached along the length of the drum.

9. An apparatus for retrieving objects from the ground comprising:
a ground engageable rotating drum with a plurality of fingers extending therefrom; and
a plurality of discs mounted relative to and rotatable in conjunction with the rotation of the drum in a direction opposite that of the drum, said toothed discs positioned adjacent to said drum and ground level during operation of the retrieval means and assisting in engagement and movement of objects by the drum and fingers to a collection location, the discs being positioned behind the drum in relation to the direction of travel of the drum.

10. The apparatus according to claim 9 wherein said discs have a toothed circumferential edge.

11. The apparatus according to claim 9 wherein said fingers are attached to the drum in rows positioned along the length of the drum and said discs are positioned intermediate the rows of fingers.

12. The apparatus according to claim 11 wherein the outer circumference of said discs is substantially tangential to the outer circumference defined by the tips of said fingers extending from the drum.

13. The apparatus according to claim 9 further comprising:
a plurality of belts engaged between pulleys positioned intermediate of said discs and corresponding pulleys spaced from the discs shafts, the belts positioned on the trailing side of the drum from the discs and assisting in the engagement and movement of objects by the drum and fingers thereon to the collection station.

14. The apparatus according to claim 9 further comprising:
means projecting between the fingers for dislodging objects from therebetween; and
a second assembly of a plurality of discs rotatably mounted on a shaft and driven in conjunction with the rotation of the drum in the same direction as the drum, said second disc assembly positioned near the top side of the drum and finger assembly and adjacent said means for dislodging the objects from the drum and finger assembly.

15. The apparatus according to claim 9 further comprising:
a second assembly of a plurality of discs rotatably mounted on a shaft and driven in conjunction with the rotation of the drum in the same direction as the drum, said second disc assembly positioned near the top side of the drum and finger assembly for directing objects carried above said first discs to a collection station.

16. The apparatus according to claim 14 wherein said second plurality of toothed discs is positioned between spaced rows of teeth attached along the length of the drum.

17. In a means for retrieving objects from the ground having a ground engagable rotating drum with a plurality of resilient fingers circumferentially spaced in rows along the drum length and extending radially therefrom, the improvement comprising:
a row of support fingers positioned approximately one quarter of the length of the drum from the ends thereof, said support fingers including a rigid inner core of a length substantially equal to the length of the resilient fingers and having a resilient covering thereon, whereby a substantial portion of the load of the drum may be carried on said support fingers.

18. A method for retrieving objects from the ground comprising:
rotating a ground engagable drum with a plurality of fingers extending therefrom over the ground for receiving objects therebetween;
positioning a plurality of discs rotatably mounted on a shaft adjacent the drum and fingers and driven in conjunction with the rotation of the drum in a direction opposite that of the drum, the plurality of discs being positioned adjacent the drum and ground level during operation of the retrieving means for assisting in the engagement and movement of objects by the drum and fingers thereon to a collection location;
stripping the objects from engagement between the fingers of the drum; and
collecting the stripped objects for later disposable.

19. The method according to claim 18 further comprising:
initially directing the objects between the discs and the fingers attached to the drum; and
then directing objects along the direction of travel of the drum and fingers using a plurality of belts extending between the disc shaft and a spaced shaft located adjacent the drum in the direction of the movement of the drum from the discs, said belts providing a semiconveyor arrangement to further direct objects along the path of rotation of the drum and finger to the collection location.

20. The method according to claim 18 further comprising:
rotating a plurality of discs adjacent the drum in the area of the means for stripping objects from the fingers extending from the drum, said second set of discs being rotated in the same direction as that of the drum to direct the objects to a collection location.

* * * * *